United States Patent
Kawano et al.

(10) Patent No.: US 6,808,553 B2
(45) Date of Patent: Oct. 26, 2004

(54) FILTER MEDIUM FOR TURBINE AND METHODS OF USING AND PRODUCING THE SAME

(75) Inventors: Eizou Kawano, Ibaraki (JP); Takuya Maeoka, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 65 days.

(21) Appl. No.: 10/166,739

(22) Filed: Jun. 12, 2002

(65) Prior Publication Data

US 2003/0010210 A1 Jan. 16, 2003

(30) Foreign Application Priority Data

Jun. 13, 2001 (JP) ........................................ 2001-179026
Jun. 13, 2001 (JP) ........................................ 2001-179027

(51) Int. Cl.[7] .......................... B01D 29/05; B01D 46/10
(52) U.S. Cl. .......................... 95/287; 55/385.3; 55/487; 55/495; 55/528; 55/DIG. 5
(58) Field of Search ................. 95/286, 287; 96/12–14; 55/385.3, 485, 487, 495, 514, 528, DIG. 5

(56) References Cited

U.S. PATENT DOCUMENTS

| | | | | |
|---|---|---|---|---|
| 4,728,349 A | * | 3/1988 | Oshitari | 55/487 |
| 4,816,328 A | * | 3/1989 | Saville et al. | 442/289 |
| 4,877,433 A | * | 10/1989 | Oshitari | 55/486 |
| 5,096,473 A | * | 3/1992 | Sassa et al. | 95/282 |
| 5,108,474 A | * | 4/1992 | Riedy et al. | 55/485 |
| 5,154,827 A | * | 10/1992 | Ashelin et al. | 210/490 |
| 5,207,812 A | * | 5/1993 | Tronto et al. | 55/498 |
| 5,234,739 A | | 8/1993 | Tanaru et al. | |
| 5,366,631 A | | 11/1994 | Adiletta | |
| 5,409,515 A | | 4/1995 | Yamamoto et al. | |
| 5,772,884 A | | 6/1998 | Tanaka et al. | |
| 5,855,783 A | | 1/1999 | Shucosky et al. | 210/493.1 |
| 6,030,428 A | * | 2/2000 | Ishino et al. | 55/486 |
| 6,030,484 A | * | 2/2000 | Maeoka et al. | 156/309.9 |
| 6,110,249 A | * | 8/2000 | Medcalf et al. | 55/514 |
| 6,149,702 A | * | 11/2000 | Kawano et al. | 55/497 |
| 6,171,684 B1 | * | 1/2001 | Kahlbaugh et al. | 428/212 |
| 6,214,093 B1 | * | 4/2001 | Nabata et al. | 96/11 |
| 6,261,979 B1 | | 7/2001 | Tanaka et al. | |
| 6,302,934 B1 | * | 10/2001 | Nabata et al. | 55/486 |
| 6,334,881 B1 | * | 1/2002 | Giannetta et al. | 55/486 |
| 6,336,948 B1 | * | 1/2002 | Inoue et al. | 55/486 |
| 6,409,787 B1 | * | 6/2002 | Smithies et al. | 55/514 |
| 6,428,610 B1 | * | 8/2002 | Tsai et al. | 96/15 |
| 2002/0046656 A1 | * | 4/2002 | Benson et al. | 95/287 |

FOREIGN PATENT DOCUMENTS

| | | |
|---|---|---|
| DE | 42 34 816 | 10/1993 |
| DE | 42 34 816 C1 | 10/1993 |
| EP | 0 391 660 | 10/1990 |
| EP | 0 576 343 | 12/1993 |
| JP | 3-221541 | 9/1991 |
| JP | 5-202217 | 8/1993 |
| JP | 2000-61280 | 2/2000 |
| JP | 3070602 | 5/2000 |
| WO | WO 93/09862 | 5/1993 |
| WO | WO 93 09862 | 5/1993 |
| WO | WO 94/16802 | 8/1994 |
| WO | WO 98/26860 | 6/1998 |

* cited by examiner

Primary Examiner—Robert H. Spitzer
(74) Attorney, Agent, or Firm—Westerman, Hattori, Daniels & Adrian LLP

(57) ABSTRACT

The present invention is to provide a filter medium for a turbine in which contamination is less likely to be caused in the turbine, and an increase in pressure loss is suppressed. One form of this filter medium includes a porous polytetrafluoroethylene (PTFE) membrane and an air-permeable supporting member. The air-permeable supporting member has a fiber diameter of not more than 15 $\mu$m. This filter medium is used by disposing the air-permeable supporting member on an upstream side of the porous PTFE membrane with respect to air flow passing through the filter medium toward the turbine. Another form of the filter medium of the present invention includes a porous PTFE membrane, a first air-permeable supporting member, and a second air-permeable supporting member.

8 Claims, 3 Drawing Sheets

FILTER MEDIUM FOR TURBINE AND METHODS OF USING AND PRODUCING THE SAME

BACKGROUND OF THE INVENTION

1. Field of the Invention

The present invention relates generally to a filter medium for a turbine including a porous polytetrafluoroethylene (hereinafter, abbreviated as "PTFE") membrane. More specifically, this invention relates to a filter medium that is used at an intake side of a gas turbine or a steam turbine installed in a power plant or the like and suited for the collection of airborne particles in the air or a gas.

This application claims priority under the Paris Convention of Japanese patent applications Nos. 2001-179026 and 2001-179027, which are hereby incorporated by reference.

2. Related Background Art

Conventionally, as a filter medium used at an intake side of a turbine, a medium formed by adding a binder to glass fibers and forming a resultant material into a sheet has been in common use. However, the presence of adherent fibrils in such a medium causes self-dusting of the medium when the medium is bent in processing. These fibrils of the glass fibers fall off a filter into a turbine to adhere to a fan. Meanwhile, PTFE is a clean material, and in recent years, a filter medium including a porous PTFE membrane has been brought into use as a high performance filter material to be used for clean rooms in the semiconductor industry. An example of this filter medium is disclosed in JP2000-61280 A.

A filter medium formed of a laminate of the porous PTFE membrane and an air-permeable supporting member exhibits a high collection efficiency compared with a glass fiber medium under the same pressure loss. Therefore, when this filter medium of the laminate type is used, an increase in pressure loss is caused during operation in a shorter time than in the case of using the glass fiber medium. Thus, when used as a filter medium for a turbine, a conventional filter medium using the porous PTFE membrane is increased in pressure loss in a shorter time.

SUMMARY OF THE INVENTION

A filter medium for a turbine of a first configuration according to the present invention includes a porous PTFE membrane and an air-permeable supporting member. The air-permeable supporting member has a fiber diameter of not more than 15 $\mu$m.

A filter medium for a turbine of a second configuration according to the present invention includes a porous PTFE membrane, a first air-permeable supporting member, and a second air-permeable supporting member. The first air-permeable supporting member and the second air-permeable supporting member are disposed on at least one side of the porous membrane. The first air-permeable supporting member has a fiber diameter smaller than that of the second air-permeable supporting member.

The present invention further provides a method of using the filter medium. In this method, the air-permeable supporting member used in the filter medium of the first configuration or the first air-permeable supporting member and the second air-permeable supporting member used in the filter medium of the second configuration is/are disposed on an upstream side of the porous PTFE membrane with respect to air flow passing through the filter medium toward the turbine.

The present invention further provides a method of producing the filter medium of the second configuration. This method includes steps of: forming an air-permeable supporting member laminate by laminating the first air-permeable supporting member and the second air-permeable supporting member; and laminating this air-permeable supporting member laminate and the porous PTFE membrane or a laminate including the porous PTFE membrane.

In the above description, the fiber diameter of the air-permeable supporting member refers to an average fiber diameter when there are variations in the fiber diameter.

DETAILED DESCRIPTION OF THE INVENTION

Figure 1:
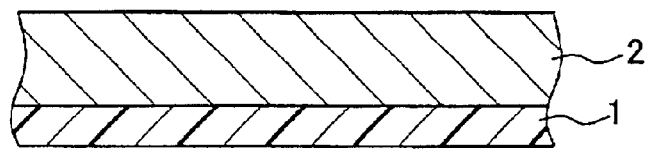
FIG. 1 is a cross-sectional view showing one embodiment of a filter medium of a first configuration according to the present invention.

Hereinafter, the present invention will be described by way of a particular embodiment.

According to the particular embodiment of the present invention, a filter medium for a turbine is provided that is clean enough to be less likely to cause contamination in the turbine and avoids an increase in pressure loss. The use of this filter medium allows safe operation of the turbine to be maintained for a long time.

The air-permeable supporting member performs a function as a reinforcing member and itself can function as a prefilter with respect to atmospheric dust. A collecting function of the air-permeable supporting member serves to prevent clogging of the porous PTFE membrane, thereby allowing an increase in pressure loss ascribable to the clogging to be suppressed. According to a dust collecting theory, the smaller the fiber diameter of the air-permeable supporting member, the more a dust collecting capability is enhanced. However, when the fiber diameter is too small, the air-permeable supporting member is decreased in strength, and thus the function of the air-permeable supporting member as the reinforcing member is sometimes impaired. Conversely, when the fiber diameter is too large, the collecting capability as the prefilter is lowered. Thus, preferably, the air-permeable supporting member has a fiber diameter of not more than 15 $\mu$m, and also, preferably, not less than 0.2 μm, and more preferably, of not more than 0.8 μm and not less than 0.2 μm, respectively.

Two types of the air-permeable supporting members varying in fiber diameter may be used so as to be assigned a role as the reinforcing member and a role as the prefilter, respectively. In this case, preferably, the first air-permeable supporting member that functions mainly as the prefilter has a fiber diameter of not more than 15 μm, preferably, of not less than 0.2 μm. This is preferable because when the fiber diameter is smaller than 0.2 μm, a decrease in mechanical strength is caused to lower workability, and when the fiber diameter is larger than 15 μm, the collecting capability is lowered. Preferably, the second air-permeable supporting member that functions mainly as the reinforcing member has a fiber diameter of not less than 1 μm and not more than 30 μm.

Because of the small fiber diameter of the first air-permeable supporting member, in producing the filter medium, after the first air-permeable supporting member is laminated to the second air-permeable supporting member of a relatively large fiber diameter (preferably, after the first air-permeable supporting member and the second air-permeable supporting member are integrated into a laminate), the laminate of the first air-permeable supporting member and the second air-permeable supporting member is laminated to the porous PTFE membrane (or a laminate including the porous PTFE membrane), so that mechanical strength is increased to enhance handling ease and workability.

Hereinafter, preferable embodiments of the present invention will be explained with reference to appended drawings.

Figure 2:
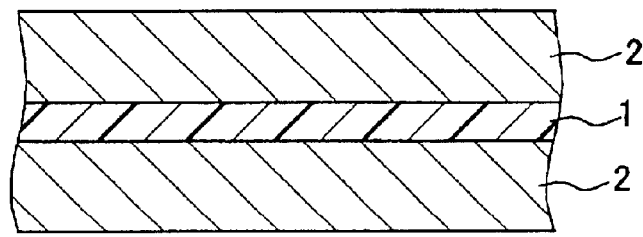
FIG. 2 is a cross-sectional view showing another embodiment of the filter medium of the first configuration according to the present invention.
Figure 3:
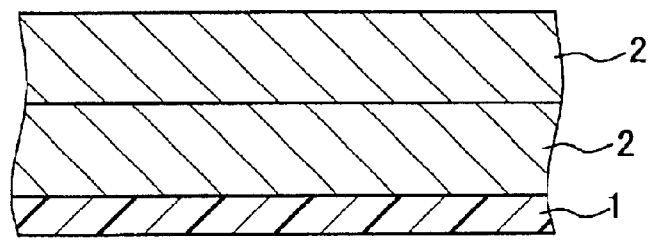
FIG. 3 is a cross-sectional view showing still another embodiment of the filter medium of the first configuration according to the present invention.

FIGS. 1 to 3 are cross-sectional views showing respective embodiments of the filter medium of the first configuration according to the present invention. In each figure, the filter medium is assumed to be disposed in use with respect to an upper side of the figure as an upstream side of air flow (a main body of the turbine is disposed on a lower side of the figure).

In each of FIGS. 1 to 3, in the filter medium, an air permeable supporting member 2 having a fiber diameter of 0.2 to 15 μm is disposed on the upstream side of a porous PTFE membrane 1. The air-permeable supporting member 2 functions as a prefilter with respect to air flow at an outermost side.

The filter medium is only required to include one layer of the porous PTFE membrane 1 and one layer of the air-permeable supporting member 2 as shown in FIG. 1. However, as shown in FIGS. 2 and 3, the filter medium may include a plurality of the air-permeable supporting members 2. In this case, at least one of the air-permeable supporting members has a fiber diameter that falls within the above-mentioned range. By using the air-permeable supporting members both having a fiber diameter that falls within the above-mentioned range, the filter medium shown in FIG. 2 can be used regardless of whether the medium is disposed in this direction or turned upside down.

Figure 4:
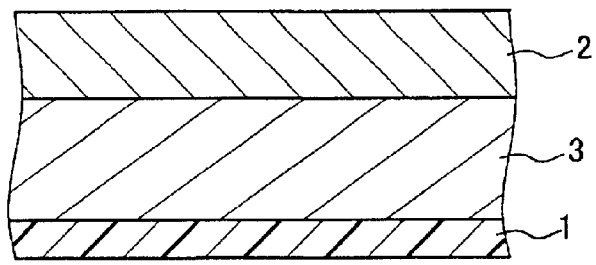
FIG. 4 is a cross-sectional view showing one embodiment of a filter medium of a second configuration according to the present invention.
Figure 5:
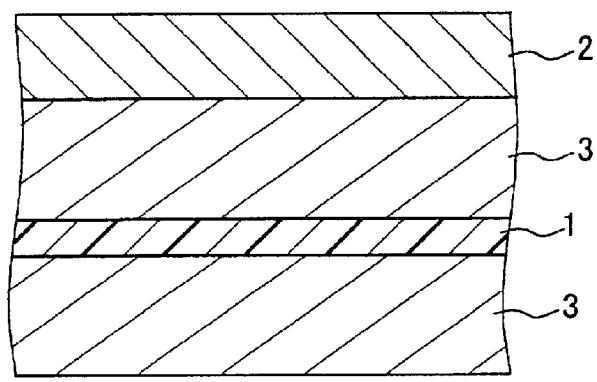
FIG. 5 is a cross-sectional view showing another embodiment of the filter medium of the second configuration according to the present invention.
Figure 6:
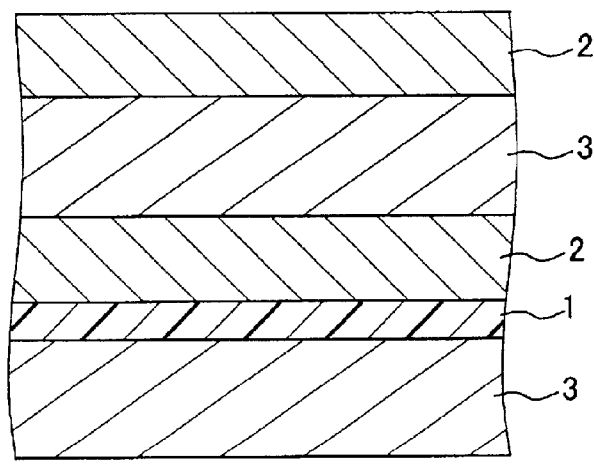
FIG. 6 is a cross-sectional view showing still another embodiment of the filter medium of the second configuration according to the present invention.

FIGS. 4 to 6 are cross-sectional views showing respective embodiments of the filter medium of the second configuration according to the present invention. In each figure, the filter medium also is disposed in use with respect to an upper side of the figure as an upstream side of air flow.

In each of FIGS. 4 to 6, in the filter medium, a first air-permeable supporting member 2 preferably having a fiber diameter of 0.2 to 15 μm is disposed on an uppermost stream side. Further, a second air-permeable supporting member 3 having a fiber diameter larger than that of the first air-permeable supporting member is included between a porous PTFE membrane 1 and the first air-permeable supporting member 2.

The second air-permeable supporting member 3 is only required to have a fiber diameter larger than that of the first air-permeable supporting member 2 used as a prefilter. However, preferably, the second air-permeable supporting member 3 has a fiber diameter of not less than 1 μm and not more than 30 μm, and most preferably, of larger than 15 μm and not more than 30 μm. As shown in FIGS. 5 and 6, for the purpose of increasing mechanical strength, two or more layers of the second air-permeable supporting members 3 may be disposed.

As shown in FIG. 6, when two or more layers of the first air-permeable supporting members 2 are disposed on the upstream side of the porous PTFE membrane 1, a capability of retaining a powder body further can be enhanced. Further, as shown in FIGS. 4 to 6, when the first air-permeable supporting member 2 is disposed on the uppermost stream side (the upper side of the figure) of the filter medium, and the second air-permeable supporting member 3 is disposed between this first air-permeable supporting member 2 and the porous PTFE membrane 1, the mechanical strength can be increased.

It is to be noted, however, that the filter medium of the present invention is not limited to the configurations shown in FIGS. 1 to 6.

As for the air-permeable supporting member 2 (or the first air-permeable supporting member 2 in each of the embodiments of the filter medium shown in FIGS. 4 to 6), a material, a structure, and a form are not particularly limited. Materials having air permeability higher than that of the porous PTFE membrane such as felt, nonwoven fabrics, woven fabrics, and meshes (mesh-like sheets) are suitable to be used as the air-permeable supporting member 2. From the viewpoint of strength, a collecting property, flexibility, and workability, it is preferable to use a nonwoven fabric. The material of the air-permeable supporting member 2 also is not particularly limited, and materials that can be used include polyolefin such as polyethylene (PE) and polypropylene (PP), polyamide, polyester such as poly (ethylene terephthalate) (PET), aromatic polyamide, or a composite material of these materials.

As for the second air-permeable supporting member 3, a material, a structure, and a form also are not particularly limited. Materials having air permeability higher than that of the porous PTFE membrane such as felt, nonwoven fabrics, woven fabrics, meshes (mesh-like sheets), or other porous materials are suitable to be used as the second air-permeable supporting member 3. As in the above case of the air-permeable supporting member 2, from the viewpoint of strength, a collecting property, flexibility, and workability, it is preferable to use a nonwoven fabric. The material of the air-permeable supporting member 3 also is not particularly limited as in the above case, and materials that can be used include polyolefin such as PE and PP, polyamide, polyester such as PET, aromatic polyamide, or a composite material of these materials.

When the nonwoven fabrics are used as the air-permeable supporting members 2 and 3, the use of synthetic fibers as conjugate fibers is particularly suitable. In the conjugate fibers, fibers have a core/sheath structure in part or in whole, and a core component has a relatively higher melting point than that of a sheath component.

The following description is directed to an example of a method of producing the porous PTFE membrane. Initially, preforming of a pastelike mixture formed by adding a liquid lubricant to a fine PTFE powder is performed. There is no particular limit to the liquid lubricant as long as the liquid lubricant is capable of moistening a surface of the fine PTFE powder and can be removed by extraction or heating. For example, hydrocarbon such as liquid paraffin, naphtha, and white oil can be used as the liquid lubricant. The liquid lubricant is contained suitably in an amount of about 5 to 50 parts by weight with respect to 100 parts by weight of the fine PTFE powder. The above-mentioned preforming is performed under a pressure such that the liquid lubricant is not wrung out. Then, a preform thus obtained is formed into a sheet by paste extrusion or rolling. A PTFE molding thus obtained is stretched at least to one axis direction, and thus a porous PTFE sheet is obtained. The stretching of the PTFE molding is performed after removing the liquid lubricant. The stretching conditions can be set as required, and both stretching in a longitudinal direction and stretching in a lateral direction may be performed under a temperature of 30 to 320° C. at a stretching ratio of 2 to 30 times. After the stretching, the porous PTFE sheet may be subjected to firing by being heated at a temperature higher than the melting point of PTFE.

Preferably, when used as a filter medium for a turbine, the porous PTFE membrane has an average pore diameter of 0.01 to 5 μm and an average fiber diameter of 0.02 to 1.0 μm and exhibits a pressure loss of 50 to 1,000 Pa when air is passed through the membrane at a velocity of flow of 5.3 cm/s.

There is no particular limit also to a method of laminating the air-permeable supporting member 2 and the porous PTFE membrane 1 or a method of laminating the air-permeable supporting members 2 and 3. In each case, simple lamination is sufficient, and methods such as lamination using an adhesive and heat lamination may be employed. When the heat lamination is employed, bonding and lamination may be performed by allowing a portion of the air-permeable supporting member to be melted by heating, or by interposing a fusion bonding agent such as a hot melt powder between layers.

In the filter medium, two or more layers of the porous PTFE membranes may be used. When these porous PTFE membranes are laminated to each other, while simple lamination is sufficient, bonding and lamination may be performed under pressure in the forming process of the porous PTFE membranes or by thermal fusion bonding.

Generally, the filter medium thus obtained is bent into continuous W-shape (subjected to a pleating process) in which a bead is formed using a hot melt adhesive or the like so that opposed surfaces of the filter medium are not brought into contact with each other. Further, the filter medium is carried by or in a metallic frame or the like, and thus an intake filter unit is formed.

The pleating process of the filter medium is performed by the following methods.
(1) A rotary method: a method in which the filter medium is pleated by rotating a pair of rotatable drums with blades that are provided on outer peripheries of the drums.
(2) A reciprocating method: a method in which the filter medium is folded from both surfaces alternately by allowing a pair of blades disposed at a predetermined distance from each other to move in a filter medium conveying direction.

The filter medium of a laminate of the porous PTFE membrane and the air-permeable supporting member is likely be charged electrically by friction in the above-mentioned laminating process and processing of the filter medium into a filter unit. When a conductor is brought close to the filter medium with a surface potential increased due to the electric charging or the filter medium is touched with a bare hand of a human, in some cases, sparks are caused to form a through hole in the filter medium. The formation of the through hole causes the collection efficiency of the filter medium to be decreased, and a so-called leaking phenomenon is caused in which the collection efficiency is not dependent on a particle diameter with respect to particles having a particle diameter smaller than a short diameter of a cross section of the through hole. For the purpose of preventing such leakage, in the processes of producing and processing the filter medium, a destaticizer is disposed in a place in which friction is likely to be caused.

In order to prevent electric charging, the porous PTFE membrane and the air-permeable supporting member may be of a material resistant to the electric charging. The electric charging of the filter medium can be suppressed by using, for example, the porous PTFE membrane and the air-permeable supporting member of a conductive or semi-conductive material obtained by kneading the material with a conductive material such as carbon and a metallic powder, or the porous PTFE membrane and the air-permeable supporting member subjected in advance to a sputtering process, a discharging process, a surface-active agent coating process, or the like so that hydrophilicity is given to the porous PTFE membrane and the air-permeable supporting member.

In each method, the filter medium is decreased in absolute value of the surface potential to about not more than 0.3 kV, so that leakage can be prevented, thereby allowing contamination to be prevented from being caused in a turbine. The measurement of the surface potential can be performed easily by using a commercial surface electrometer.

Preferably, the filter medium as a whole has a thickness of 0.1 mm to 10 mm, and more preferably, of 0.2 mm to 1.0 mm. When the filter medium is too thick, in some cases, pressure loss is increased, and a pleating property is degraded. Conversely, when the filter medium is too thin, in some cases, rigidity is lowered.

EXAMPLE

Hereinafter, the present invention will be described in greater detail by way of examples. However, the present invention is not limited to the examples. In Examples 1 to 3 and Comparative Example 1, as shown in FIG. 1, one layer of the porous PTFE membrane and one layer of the air-permeable supporting member were laminated to form the filter medium. In Examples 4 to 6 and Comparative Example 2, as shown in FIG. 5, the first air-permeable supporting member 2, the second air-permeable supporting member 3, the porous PTFE membrane 1, and the second air-permeable supporting member 3 were laminated in this order to form the filter medium.

The respective properties of the porous PTFE membrane, the air-permeable supporting member, and the filter medium were determined in the following manner.
(1) Fiber Diameter
A scanning electron microscope (SEM) was used to shoot microphotographs of surfaces of the air-permeable supporting members, and the measurement was performed by using the microphotographs.
(2) Pressure Loss
Each sample was attached to a circular holder having an effective area of 100 cm$^2$, and a pressure difference was given between the upstream side and the downstream side. Atmospheric dust supplied from the upstream side was passed through the sample, while the velocity of flow of the sample was regulated so as to be 5.3 cm/s, and the pressure loss was measured at a given interval using a pressure gauge. When used as the sample, the filter medium was set so that the upstream side of the filter medium was positioned on a side of an inlet for the atmospheric dust.

(3) DHC (Dust Holding Capacity)

In the same manner as in the case of measuring the pressure loss, atmospheric dust was passed through each sample, and a change in weight of the sample was measured at a given interval using an electronic balance.

(4) Collection Efficiency

Each sample was set in the same manner as in the case of measuring the pressure loss. Then, while the velocity of flow of the sample was regulated so as to be 5.3 cm/s, particles of polydisperse dioctyl phthalate (hereinafter, abbreviated as "DOP") were supplied on the upstream side of the sample so that the concentration of the particles having a particle diameter of not less than 0.5 $\mu$m was about $10^7$ particles/liter. The respective concentrations of the DOP particles on the upstream side and the DOP particles on the downstream side that had passed through the sample were measured using a particle counter, and the collection efficiency was determined by the following equation. The particles used in the measurement had a particle diameter of not less than 0.5 $\mu$m.

Collection efficiency (%)=[1−(concentration on downstream side/ concentration on upstream side)]×100

Example 1

Preforming of a pastelike mixture formed by adding 30 parts by weight of a liquid lubricant (liquid paraffin) to 100 parts by weight of a fine PTFE powder is performed. Then, a preform thus obtained was formed into a shape of a round bar by the paste extrusion. A molding thus obtained was stretched under pressure to a thickness of 0.2 mm, and the liquid lubricant was removed by extraction using normal decane. Then, the molding was stretched in a longitudinal direction under a temperature of 300° C. at a stretching ratio of 10 times and subsequently in a lateral direction under a temperature of 120° C. at a stretching ratio of 30 times. The molding was subjected further to firing under a temperature of 400° C. for 0.5 seconds. In this manner, a porous PTFE membrane (thickness: 10 $\mu$m, porosity: 93%, average pore diameter: 1.0 $\mu$m, average fiber diameter: 0.2 $\mu$m, pressure loss: 176.5 Pa, collection efficiency: 99.999%) was obtained.

As the air-permeable supporting member to be laminated to this porous PTFE membrane, a PP nonwoven fabric having a fiber diameter of about 0.5 to 3 $\mu$m (average diameter: about 1.5 $\mu$m) and a basis weight of 30 g/m$^2$ was used. The porous PTFE membrane and the air-permeable supporting member were subjected to heat lamination by being passed between a pair of rolls heated to a temperature of 180° C., and thus a filter medium for a turbine having a thickness of 0.15 mm was obtained.

Example 2

A filter medium for a turbine having a thickness of 0.20 mm was obtained in the same manner as in the case of Example 1 except that as the air-permeable supporting member, a PP nonwoven fabric having a fiber diameter of about 2 to 5 $\mu$m (average diameter: about 3.5 $\mu$m) and a basis weight of 30 g/m$^2$ was used.

Example 3

A filter medium for a turbine having a thickness of 0.22 mm was obtained in the same manner as in the case of Example 1 except that as the air-permeable supporting member, a PP nonwoven fabric having a fiber diameter of about 7 to 12 $\mu$m (average diameter: about 10 $\mu$m) and a basis weight of 30 g/m$^2$ was used.

Comparative Example 1

A filter medium for a turbine having a thickness of 0.28 mm was obtained in the same manner as in the case of Example 1 except that as the air-permeable supporting member, a PP nonwoven fabric having a fiber diameter of about 18 to 22 $\mu$m (average diameter: about 20 $\mu$m) and a basis weight of 30 g/m$^2$ was used.

Figure 7:
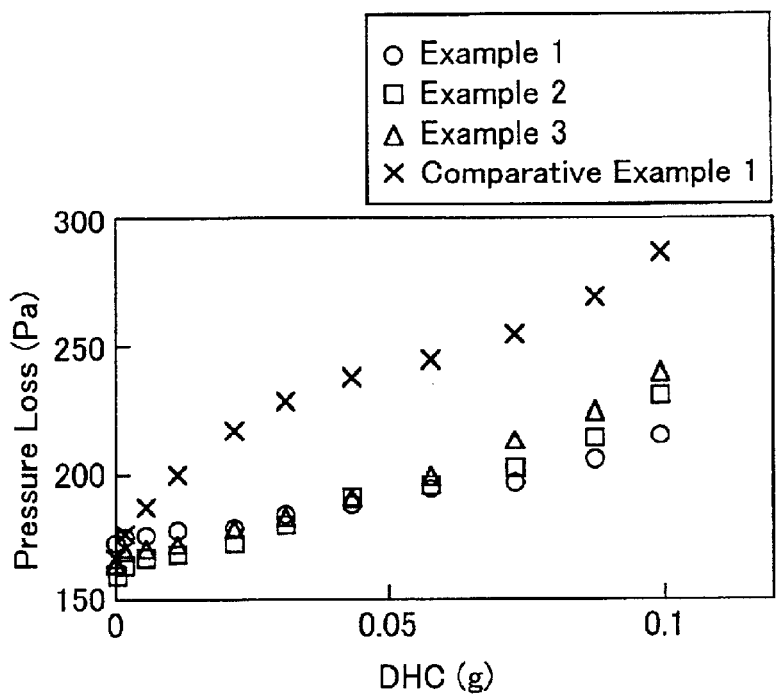
FIG. 7 is a graph showing the relationship between DHC (Dust Holding Capacity) and pressure loss in examples of the present invention.

With respect to the air-permeable supporting members used in Examples 1 to 3 and Comparative Example 1, measurements were made of the collection efficiency in a state where each of the supporting members was not laminated to the porous PTFE membrane. The results are shown in Table 1. Further, with respect to the filter media obtained using these air-permeable supporting members, measurements were made of the pressure loss and the DHC. The results are shown in FIG. 7.

TABLE 1

|  | Collection efficiency (%) |
|---|---|
| Example 1 | 86 |
| Example 2 | 85 |
| Example 3 | 80 |
| Comparative Example 1 | 10 |

As shown in Table 1, each of the air-permeable supporting members used in Examples 1 to 3 exhibited a higher dust collection efficiency than that of the air-permeable supporting member used in Comparative Example. In each of the filter media of Examples 1 to 3 using the air-permeable supporting members having a high collection efficiency of this degree, as shown in FIG. 7, an increase in pressure loss was suppressed compared with the pressure loss of the filter medium of Comparative Example at the same DHC value.

Comparison among Examples 1 to 3 indicates that the smaller the fiber diameter, the more effectively the air-permeable supporting member functions as a prefilter. As the prefilter, most preferably, an air-permeable supporting member is used that exhibits a collection efficiency of 70 to 99% as a result of the measurement performed under the above conditions.

Example 4

In the same manner as in the case of Example 1, a porous PTFE membrane (thickness: 10 $\mu$m, porosity: 93%, average pore diameter: 1.0 $\mu$m, average fiber diameter: 0.2 $\mu$m, pressure loss: 176.5 Pa, collection efficiency: 99.999%) was obtained. In this example, as the first air-permeable supporting member, a PP nonwoven fabric having a fiber diameter of about 0.5 to 3 $\mu$m (average diameter: about 1.5 $\mu$m) and a basis weight of 30 g/m$^2$ was prepared. Further, as the second air-permeable supporting member, a PET (core component)/PE (sheath component) nonwoven fabric having a fiber diameter of about 20 $\mu$m and a basis weight of 30 g/m$^2$ was prepared.

Next, the first air-permeable supporting member and the second air-permeable supporting member were subjected to heat lamination by being passed through a pair of rolls heated to a temperature of 130° C. so as to be bonded to each other, and thus a two-layer article of the air-permeable supporting members was obtained. Further, the porous PTFE membrane and the second air-permeable supporting member were subjected to heat lamination by being passed through the pair of rolls heated to a temperature of 180° C. so as to be bonded to each other, and thus a two-layer article of the porous PTFE membrane and the second air-permeable supporting member was obtained. Subsequently, these two-layer articles were laminated to each other so that the porous PTFE membrane and the second air-permeable supporting member were brought into contact with each other. A laminate thus obtained was subjected to heat lamination by being passed through the pair of rolls heated to a temperature of 130° C., and thus a filter medium for a turbine having a thickness of 0.3 mm was obtained.

Example 5

A filter medium for a turbine having a thickness of 0.32 mm was obtained in the same manner as in the case of Example 4 except that as the first air-permeable supporting member, a PP nonwoven fabric having a fiber diameter of about 2 to 5 $\mu$m (average diameter: about 3.5 $\mu$m) and a basis weight of 30 g/m$^2$ was used.

Example 6

A filter medium for a turbine having a thickness of 0.34 mm was obtained in the same manner as in the case of Example 4 except that as the first air-permeable supporting member, a PP nonwoven fabric having a fiber diameter of about 7 to 12 $\mu$m (average diameter: about 10 $\mu$m) and a basis weight of 30 g/m$^2$ was used.

Comparative Example 2

A filter medium for a turbine having a thickness of 0.38 mm was obtained in the same manner as in the case of Example 4 except that as the first air-permeable supporting member, a PP nonwoven fabric having a fiber diameter of about 20 $\mu$m and a basis weight of 30 g/m$^2$ was used.

Figure 8:
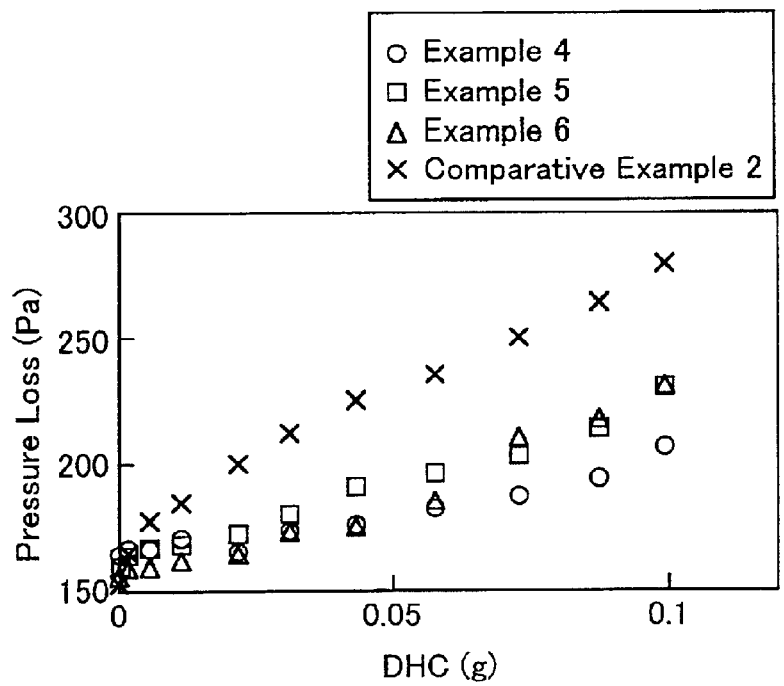
FIG. 8 is another graph showing the relationship between DHC and pressure loss in examples of the present invention.

With respect to the air-permeable supporting members used in Examples 4 to 6 and Comparative Example 2, measurements were made of the collection efficiency in a state where each of the supporting members was not laminated to the porous PTFE membrane. The results are shown in Table 2. Further, with respect to the filter media produced in each of Examples and Comparative Example, measurements were made of the pressure loss and the DHC. The results are shown in FIG. 8.

TABLE 2

|  | Collection efficiency (%) |
| --- | --- |
| Example 4 | 86 |
| Example 5 | 85 |
| Example 6 | 80 |
| Comparative Example 2 | 10 |

As shown in Table 2, each of the air-permeable supporting members used in Examples 4 to 6 exhibited a higher dust collection efficiency than that of the air-permeable supporting member used in Comparative Example 2. In each of the filter media of Examples, as shown in FIG. 8, an increase in pressure loss was suppressed compared with the pressure loss of the filter medium of Comparative Example at the same DHC value.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A filter medium for a turbine comprising a porous polytetrafluoroethylene membrane, a first air-permeable supporting member, and a second air-permeable supporting member, wherein the first air-permeable supporting member and the second air-permeable supporting member are disposed on at least one side of the porous membrane; and the first air-permeable supporting member has a fiber diameter smaller than that of the second air-permeable supporting member.

2. The filter medium according to claim 1, wherein the second air-permeable supporting member is disposed between the porous polytetrafluoroethylene membrane and the first air-permeable supporting member.

3. The filter medium according to claim 1, wherein the first air-permeable supporting member has a fiber diameter of not more than 15 $\mu$m.

4. The filter medium according to claim 1, wherein the first air-permeable supporting member has a fiber diameter of not less than 0.2 $\mu$m.

5. The filter medium according to claim 1, wherein the second air-permeable supporting member has a fiber diameter of not less than 1 $\mu$m and not more than 30 $\mu$m.

6. The filter medium according to claim 1, wherein the filter medium as a whole has a thickness of 0.1 mm to 10 mm.

7. A method of using a filter medium for a turbine, the filter medium being a medium as claimed in claim 1, wherein the first air-permeable supporting member and the second air-permeable supporting member are disposed on an upstream side of the porous polytetrafluoroethylene membrane with respect to air flow passing through the filter medium toward the turbine.

8. A method of producing a filter medium for a turbine, the filter medium being a medium as claimed in claim 1, comprising:

forming an air-permeable supporting member laminate by laminating the first air-permeable supporting member and the second air-permeable supporting member; and laminating the air-permeable supporting member laminate and the porous polytetrafluoroethylene membrane or a laminate including the porous polytetrafluoroethylene membrane.

* * * * *